UNITED STATES PATENT OFFICE.

BERTHOLD SINGER, OF CHICAGO, ILLINOIS.

COMPOSITION FOR LAYING AND ABSORBING DUST.

No. 803,632.　　　　Specification of Letters Patent.　　　　Patented Nov. 7, 1905.

Application filed December 22, 1904. Serial No. 238,028.

*To all whom it may concern:*

Be it known that I, BERTHOLD SINGER, a citizen of the United States, residing at Chicago, in the county of Cook and State of Illinois, have invented a certain new and useful Composition of Matter for Laying and Absorbing Dust, of which the following is a full, clear, and exact specification.

My invention relates to a substance adapted to be placed upon the floors of rooms and other surfaces for laying and collecting or absorbing the dust thereon preparatory to and during sweeping; and it has for its primary object to provide a simple, inexpensive, and efficient composition of matter which may be thus used without danger of damaging the floors, carpets, and other surfaces where placed and will form into minute round particles or bodies capable of rolling over the surface to be swept and of adhering to and collecting or absorbing the dust.

Another important object of this invention is to provide a composition of matter of the described character which will not freeze at ordinary atmospheric temperatures; and a still further object is to provide an efficient composition for the described purpose capable of being made from ingredients that are common the world over.

With the described ends in view the invention consists of a composition of matter containing a suitable oil or oily substance whose function or office is to absorb or collect the particles of dust, a vehicle or carrier for absorbing the oil and for which the oil will have greater affinity than it has for the floor or surface with which it comes into contact, and which carrier will therefore retain the oil and prevent it from damaging such surfaces; a non-freezing absorbent, consisting of a soluble salt, whose office is to collect the oil-absorbent into small or minute bodies and at the same time prevent the entire mass from freezing at ordinary atmospheric temperatures, as well as itself serving as an absorbent for the oil. These are the principal and essential ingredients of the composition; but it may be greatly improved by the addition of clean sand, preferably white silica, about sixty per cent. of which is employed and which serves to cut the mass or break it up and prevent the small bodies from adhering too much together, and it may be still further improved by the addition of sawdust, which intermingles with the other particles and gives body to the mass, reducing its specific gravity or weight and better adapting it to be swept across the floor or other surface where the dust exists. For the oil-absorbent I employ cement, which may be the form commercially known as "Portland cement" or any other character of cement—as, for example, that which is made from the residuum of metal-furnaces, known as "slag"—and chalk. For the non-freezing absorbent I employ chlorid of sodium, or common salt. For the oil or oily substance I employ kerosene or any other product of petroleum or, in fact, any non-volatile oil.

In preparing the composition I proceed as follows: To about ten per cent. of cement, which should preferably be of a coarse grade, I add fifteen per cent. of the chlorid of sodium in the granular state and which has previously been thoroughly dried to expel as far as possible the moisture, and after these two ingredients have been thoroughly intermingled I add about five per cent. of the oil, which is thoroughly mixed with the entire mass, causing all of the free oil to be entirely absorbed by the particles of cement and salt. The sand or silica is then added and the entire mass again stirred, causing the same to be cut or divided into small particles and serving to keep these particles separated, whereby the small round bodies before referred to are produced, and it will be found that each of these is capable of rolling independently and absorbing or collecting on its entire surface the particles of dust with which it comes into contact, thereby also increasing the area of contact of the dust-absorbing material by thus multiplying the particles. The mass or composition thus produced, while capable of accomplishing the desired object, is objectionably heavy and without the necessary or desirable body which perfectly adapts it for sweeping purposes, and therefore I prefer to add to it ten per cent. of the sawdust, which may be sifted or otherwise rendered fine; but any suitable sawdust may be employed. The sawdust is thoroughly intermingled with the entire mass by stirring or any other suitable agitating method.

With a composition of matter thus composed it will be found that the oil is absorbed by the salt and the cement, and the particles or granules of salt being porous and absorbent become thoroughly saturated with the oil-laden particles of cement and serve to collect the cement into small bodies and prevent it from flying in the form of dust, as well as serving as a permanent agent for taking up or absorbing any superfluous oil and preventing the oil from leaving the cement and adhering to or staining the floor or other surface with which it comes in contact.

While I have been particular to describe the exact proportions which I prefer to employ for producing the best result, it will nevertheless be understood that these may be considerably varied without departing from the spirit of my invention, and it is also obvious that any suitable coloring-matter or perfume may be added, if desired.

The amount of the composition to be employed is of course dependent upon the size of the area to be swept. It is laid upon the floor or other surface in an elongated pile, and then the sweeping operation is commenced in a direction crosswise of the pile, advancing the pile before the broom as the sweeping proceeds, and it may be used repeatedly or as often as desired.

Cement is common the world over and may be readily obtained everywhere at small cost, but if used alone or without the salt or chlorid of sodium would fly like the dust itself, and therefore would be entirely inadequate, and if merely mixed with the oil and other ingredients without the chlorid of sodium its particles would stick together or adhere in mass, and consequently be incapable of producing the result; but when salt in a granular form is employed the granules collect the particles of the cement into the form of the aforesaid minute bodies, and thus fulfil the twofold office or function of imparting the desired formation to the material and preventing it from freezing.

Having thus described my invention, what I claim as new therein, and desire to secure by Letters Patent, is—

1. The herein-described composition of matter containing a fluid oily substance, chlorid of sodium in a granular state, in which the oily substance is absorbed, and a finely-divided porous oil-absorbent free from rosinous material.

2. The herein-described composition of matter containing an oily substance, granulated chlorid of sodium, and cement.

3. The herein-described composition of matter containing a fluid oily substance, an oil-absorbent therefor consisting of a soluble salt in a granulated form, a porous oil-absorbent in a finely-divided form, and sand, all mixed together in a dry granular mass free from rosinous material.

4. The herein-described composition of matter containing an oily substance, an oil-absorbent therefor consisting of a soluble salt, a porous oil-absorbent in a finely-divided state, sand, and sawdust.

5. The herein-described composition of matter consisting of granular chlorid of sodium, an oily substance, cement, silica and sawdust.

6. The herein-described composition of matter for laying and absorbing dust containing a granulated, porous oil-absorbent, chlorid of sodium in a dry state, and a fluid oily substance with which the oil-absorbent and chlorid of sodium are impregnated, mixed together in a granular state and free from rosinous material.

7. The herein-described composition of matter for laying and absorbing dust containing soluble salt free from moisture, sawdust, and an oily substance.

8. The herein-described composition of matter for laying and absorbing dust containing soluble salt, sawdust and oil, all mixed together in a dry granular mass.

9. The herein-described composition of matter for laying and absorbing dust containing soluble salt in a dry state, silica and a fluid oil, all mixed together in a dry granular mass free from rosinous material.

10. The herein-described composition of matter for laying and absorbing dust containing soluble salt in a dry state, oil and cement, all mixed together in a dry granular mass.

BERTHOLD SINGER.

Witnesses:
C. H. CRAWFORD,
F. HEEREN.